US012747417B2

(12) United States Patent
Fu et al.

(10) Patent No.: US 12,747,417 B2
(45) Date of Patent: Sep. 29, 2026

(54) AMBIENT MOISTURE-ACTIVATED HARD SURFACE TREATMENT POWDER COMPRISING A CARBONATE/PERSALT/SULFONIUM OR PHOSPHONIUM SALT COMBINATION

(71) Applicant: Sterilex, LLC, Hunt Valley, MD (US)

(72) Inventors: Edward Fu, Hunt Valley, MD (US); Mark Wozniak, Hunt Valley, MD (US); Chris Bergstrom, Hunt Valley, MD (US)

(73) Assignee: Sterilex, LLC, Hunt Valley, MD (US)

( * ) Notice: Subject to any disclaimer, the term of this patent is extended or adjusted under 35 U.S.C. 154(b) by 248 days.

(21) Appl. No.: 18/765,968

(22) Filed: Jul. 8, 2024

(65) Prior Publication Data

US 2024/0384207 A1 Nov. 21, 2024

Related U.S. Application Data

(63) Continuation of application No. 17/071,039, filed on Oct. 15, 2020, now Pat. No. 12,060,543, which is a continuation of application No. 16/031,120, filed on Jul. 10, 2018, now Pat. No. 10,851,328, which is a continuation of application No. 15/786,839, filed on Oct. 18, 2017, now Pat. No. 10,053,653.

(60) Provisional application No. 62/409,497, filed on Oct. 18, 2016.

(51) Int. Cl.

| | |
|---|---|
| ***C11D 3/10*** | (2006.01) |
| ***C11D 1/60*** | (2006.01) |
| ***C11D 1/62*** | (2006.01) |
| ***C11D 1/722*** | (2006.01) |
| ***C11D 3/00*** | (2006.01) |
| ***C11D 3/20*** | (2006.01) |
| ***C11D 3/30*** | (2006.01) |
| ***C11D 3/33*** | (2006.01) |
| ***C11D 3/36*** | (2006.01) |
| ***C11D 3/37*** | (2006.01) |
| ***C11D 3/39*** | (2006.01) |
| ***C11D 3/40*** | (2006.01) |
| ***C11D 7/12*** | (2006.01) |
| ***C11D 7/14*** | (2006.01) |
| ***C11D 17/06*** | (2006.01) |

(52) U.S. Cl.

CPC .............. *C11D 3/3902* (2013.01); *C11D 1/60* (2013.01); *C11D 1/62* (2013.01); *C11D 1/722* (2013.01); *C11D 3/0047* (2013.01); *C11D 3/10* (2013.01); *C11D 3/2003* (2013.01); *C11D 3/2065* (2013.01); *C11D 3/30* (2013.01); *C11D 3/33* (2013.01); *C11D 3/361* (2013.01); *C11D 3/3707* (2013.01); *C11D 3/3942* (2013.01); *C11D 3/40* (2013.01); *C11D 7/12* (2013.01); *C11D 7/14* (2013.01); *C11D 17/06* (2013.01); *C11D 2111/20* (2024.01)

(58) Field of Classification Search
None
See application file for complete search history.

(56) References Cited

U.S. PATENT DOCUMENTS

| | | | |
|---|---|---|---|
| 3,296,145 | A | 1/1967 | Findlan et al. |
| 3,506,756 | A | 4/1970 | Hoss |
| 3,836,669 | A | 9/1974 | Dadekian |
| 4,181,621 | A | 1/1980 | Raaf et al. |
| 4,526,698 | A | 7/1985 | Kuroda et al. |
| 4,847,089 | A | 7/1989 | Kramer et al. |
| 4,941,989 | A | 7/1990 | Kramer et al. |
| 5,284,621 | A | 2/1994 | Kaufman |
| 5,320,805 | A | 6/1994 | Kramer et al. |
| 5,332,518 | A | 7/1994 | Kuroda et al. |
| 5,356,555 | A | 10/1994 | Huth et al. |
| 5,480,643 | A | 1/1996 | Donovan et al. |
| 5,537,636 | A | 7/1996 | Uchida et al. |
| 5,616,281 | A | 4/1997 | Hardy et al. |
| 5,696,171 | A | 12/1997 | Rupp et al. |
| 5,728,542 | A | 3/1998 | Charm et al. |
| 5,904,161 | A | 5/1999 | Rai et al. |
| 6,028,113 | A | 2/2000 | Scepanski |
| 6,103,685 | A | 8/2000 | Hall |
| 6,153,567 | A | 11/2000 | Hughes |
| 6,165,505 | A | 12/2000 | DeSenna et al. |
| 6,395,698 | B1 | 5/2002 | Daun et al. |
| 6,429,185 | B1 | 8/2002 | Ollero Novo et al. |

(Continued)

FOREIGN PATENT DOCUMENTS

| | | |
|---|---|---|
| CA | 3040498 C | 4/2018 |
| CL | 199700046 | 5/1997 |

(Continued)

OTHER PUBLICATIONS

EPO Examination Report for EP 17794149.9 dated Nov. 29, 2024, 5 pages.
Canadian Patent Application No. 3130812, Examination Report mailed Nov. 22, 2022, 5 pages.
European Patent Application No. 17794149.9, EPO Communication mailed Nov. 29, 2024, 5 pages.
International Search Report and Written Opinion dated Jan. 8, 2018 for Application No. PCT/US2017/057122, 10 pages.
Australian Office Action, Examination Report No. 1 for standard patent application, dated May 29, 2019 for Application No. AU 2017345307, 2 pages.

(Continued)

*Primary Examiner* — Charles I Boyer
(74) *Attorney, Agent, or Firm* — FBT Gibbons LLP; Nicole M. Tepe

(57) ABSTRACT

Ambient moisture-activatable surface treatment powders containing persalt, positively charged phase transfer agent and alkaline pH buffering may be activatable without the addition of liquid. Some ambient moisture-activatable surface treatment powders are substantially free of bleach activators and/or chlorine. Methods of use of ambient moisture activatable powders include applying them to the surfaces to be treated.

16 Claims, 1 Drawing Sheet

(56) References Cited

U.S. PATENT DOCUMENTS

| | | | | |
|---|---|---|---|---|
| 6,436,445 | B1* | 8/2002 | Hei | A01N 37/16 424/723 |
| 6,455,086 | B1 | 9/2002 | Trinh et al. | |
| 6,534,075 | B1 | 3/2003 | Hei et al. | |
| 6,583,098 | B1 | 6/2003 | Cassie | |
| 6,583,181 | B1 | 6/2003 | Chiang et al. | |
| 6,689,732 | B1 | 2/2004 | Guedira et al. | |
| 7,053,039 | B2 | 5/2006 | Burt et al. | |
| 8,287,916 | B2 | 10/2012 | Board et al. | |
| 8,658,191 | B2 | 2/2014 | Biering et al. | |
| 8,920,715 | B2 | 12/2014 | Roberts et al. | |
| 9,204,655 | B2 | 12/2015 | Stevenson et al. | |
| 10,053,653 | B2 | 8/2018 | Fu et al. | |
| 10,660,338 | B2 | 5/2020 | Joseph | |
| 10,851,328 | B2 | 12/2020 | Fu et al. | |
| 2002/0028757 | A1 | 3/2002 | Esposito et al. | |
| 2002/0061831 | A1 | 5/2002 | Kaziska et al. | |
| 2002/0128165 | A1 | 9/2002 | Baker et al. | |
| 2002/0177541 | A1 | 11/2002 | Tarara et al. | |
| 2003/0003013 | A1 | 1/2003 | Castellini | |
| 2003/0136942 | A1 | 7/2003 | Smith et al. | |
| 2003/0139310 | A1 | 7/2003 | Smith et al. | |
| 2003/0162685 | A1 | 8/2003 | Man et al. | |
| 2003/0166484 | A1 | 9/2003 | Kingma et al. | |
| 2003/0207776 | A1 | 11/2003 | Shefer et al. | |
| 2003/0207784 | A1 | 11/2003 | Himmrich et al. | |
| 2003/0232734 | A1* | 12/2003 | Kitko | C11D 3/2075 510/311 |
| 2004/0097392 | A1* | 5/2004 | Connor | A61K 8/361 510/327 |
| 2004/0116317 | A1 | 6/2004 | Burt et al. | |
| 2005/0058719 | A1 | 3/2005 | Ramirez et al. | |
| 2005/0101508 | A1 | 5/2005 | Winter et al. | |
| 2005/0153854 | A1 | 7/2005 | Meyer | |
| 2005/0155937 | A1* | 7/2005 | Zawada | A61K 8/365 210/764 |
| 2005/0176599 | A1 | 8/2005 | Bergquist et al. | |
| 2005/0227890 | A1 | 10/2005 | Van Dijk et al. | |
| 2007/0037726 | A1 | 2/2007 | Brooker et al. | |
| 2007/0249509 | A1 | 10/2007 | Tucker | |
| 2008/0032910 | A1* | 2/2008 | Smets | C11D 11/04 510/342 |
| 2008/0139435 | A1 | 6/2008 | MacGregor | |
| 2008/0176943 | A1* | 7/2008 | Kaiser | A01N 59/00 514/557 |
| 2009/0032063 | A1 | 2/2009 | Haas et al. | |
| 2009/0142235 | A1 | 6/2009 | Rico et al. | |
| 2009/0176887 | A1 | 7/2009 | Masaty et al. | |
| 2009/0324514 | A1 | 12/2009 | Awad | |
| 2010/0075883 | A1 | 3/2010 | Geret et al. | |
| 2010/0115708 | A1 | 5/2010 | Caswell et al. | |
| 2012/0328681 | A1 | 12/2012 | Hassler et al. | |
| 2013/0052342 | A1 | 2/2013 | Stevenson et al. | |
| 2013/0171264 | A1 | 7/2013 | Finan | |
| 2014/0073551 | A1 | 3/2014 | Mort, III et al. | |
| 2014/0287062 | A1 | 9/2014 | Gelmi et al. | |
| 2014/0315719 | A1 | 10/2014 | Rau | |
| 2015/0093425 | A1 | 4/2015 | Moore | |
| 2015/0210964 | A1 | 7/2015 | Willey et al. | |
| 2015/0291944 | A1 | 10/2015 | Graycar et al. | |
| 2016/0066580 | A1 | 3/2016 | Stevenson et al. | |
| 2016/0193270 | A1 | 7/2016 | Scholz et al. | |
| 2016/0270389 | A1 | 9/2016 | Glasbey | |
| 2016/0295860 | A1 | 10/2016 | Dagher et al. | |
| 2016/0354306 | A1 | 12/2016 | Rau et al. | |
| 2017/0037387 | A1* | 2/2017 | Cascao-Pereira | C12N 9/2414 |
| 2017/0130172 | A1 | 5/2017 | Smets et al. | |
| 2017/0164616 | A1 | 6/2017 | Gane et al. | |

FOREIGN PATENT DOCUMENTS

| | | | |
|---|---|---|---|
| CN | 101613642 | A | 12/2009 |
| CN | 102459551 | A | 5/2012 |
| CN | 104830577 | A | 8/2015 |
| CN | 105101794 | A | 11/2015 |
| CN | 107072212 | A | 8/2017 |
| CN | 108753490 | A | 11/2018 |
| DE | 19521140 | A1 | 12/1996 |
| EP | 1111034 | A1 | 6/2001 |
| EP | 3094177 | B1 | 12/2018 |
| EP | 3529343 | A1 | 8/2019 |
| GB | 2522074 | A | 1/2014 |
| JP | 5369839 | A2 | 6/1978 |
| JP | 2000186005 | A2 | 7/2000 |
| JP | 3215413 | B2 | 10/2001 |
| WO | WO/1992/000369 | A1 | 1/1992 |
| WO | WO 2000/002981 | A2 | 1/2000 |
| WO | WO 2000/057703 | A1 | 10/2000 |
| WO | WO 2002/026272 | A1 | 4/2002 |
| WO | WO 2009/122125 | A1 | 10/2009 |
| WO | WO 2015/076840 | A1 | 5/2015 |
| WO | 2015107342 | A1 | 7/2015 |
| WO | WO 2015/198338 | A1 | 12/2015 |
| WO | 2018075604 | A1 | 4/2018 |

OTHER PUBLICATIONS

Australian Divisional Office Action dated Dec. 8, 2020 for Application No. AU 2020202366, 4 pages.

Brazilian Office Action dated Jul. 7, 2021 for Application No. 112019007795.2, 5 pages.

Canadian Office Action dated Aug. 16, 2019 for Application CA 3,040,498, 4 pages.

Canadian Office Action dated Jun. 22, 221 for Application No. 3,040,498, 3 pages.

Chilean Office Action dated Apr. 8, 2020 for Application No. CL 201901056, 17 pags.

Chinese Office Action, Notification of the First Office Action, and Patent Search Report dated Nov. 18, 2019 for Application No. CN 201780064093.6, 6 pages.

Chinese Office Action dated Apr. 28, 2022 for Application No. 2020 10486494.4, 2 pages.

Chinese Divisional Office Action dated Jan. 28, 2021 for Application No. 2020104864944, 8 pages.

European Examination Report dated Apr. 9, 2020 for Application No. EP 17794149.9, 6 pages.

New Zealand Examination Report dated Jun. 25, 2019 for Application No. 753687, 3 pages.

U.S. Appl. No. 15/664,122, filed Jul. 31, 2017, entitled, "Aluminum-Compatible Compositions for 2-Part Alkaline Disinfectants and Sanitizers".

A. Josowitz, "Dry Floor Products Won't Slip Up" http://foodqualityandsafety.com/article/dry-floor-products-wont-slip-up/; Posted Jun. 5, 2013; accessed Jun. 20, 2017.

D. Vics, "Powdered Oxygen-Based Cleansers—How They Work", http://cryptobrewology.com/home-brewing-tips/the-scoop-on-powdered-oxygen-based-cleansers/posted Jan. 12, 2012; accessed Jun. 20, 2017.

* cited by examiner

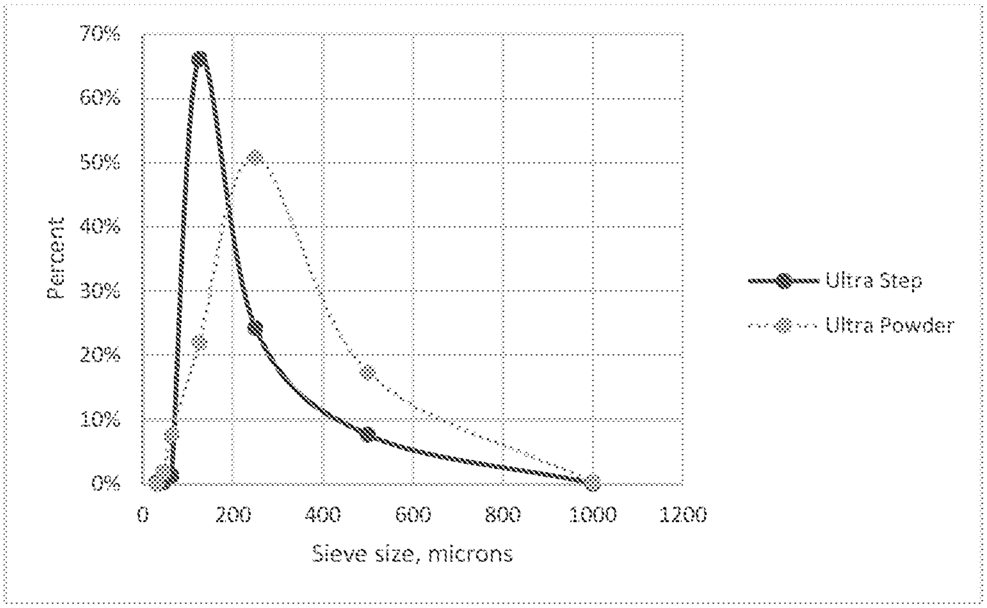
70%
60%
50%
40%
30%
20%
10%
0%
Percent
0
200
400
600
800
1000
1200
Sieve size, microns
Ultra Step
Ultra Powder

AMBIENT MOISTURE-ACTIVATED HARD SURFACE TREATMENT POWDER COMPRISING A CARBONATE/PERSALT/SULFONIUM OR PHOSPHONIUM SALT COMBINATION

PRIORITY

This application claims priority to U.S. patent application Ser. No. 17/071,039, filed Oct. 15, 2020, published as U.S. Pat. App. Pub. No. 2021/0079319 on Mar. 18, 2021, and entitled "Ambient Moisture-Activated Hard Surface Treatment Powder" which claims priority to U.S. patent application Ser. No. 16/031,120, filed on Jul. 10, 2018, issued as U.S. Pat. No. 10,851,328 on Dec. 1, 2020, entitled "Ambient Moisture-Activated Hard Surface Treatment Powder" which claims priority to U.S. patent application Ser. No. 15/786,839, filed on Oct. 18, 2017, issued as U.S. Pat. No. 10,053,653 on Aug. 21, 2018, and entitled, "Ambient Moisture-Activated Hard Surface Treatment Powder," which claims priority to U.S. Provisional Patent Application Ser. No. 62/409,497, filed on Oct. 18, 2016, and entitled, "Compositions for Percarbonate Based Powder Sanitizer Activated by Ambient Moisture," the disclosures of which are incorporated herein by reference.

TECHNICAL FIELD

Ambient moisture-activatable surface treatment powders and methods of using the same to treat surfaces are disclosed herein. The ambient moisture-activatable surface treatment powders may comprise persalt, positively charged phase transfer agent and alkaline buffering salt.

BACKGROUND

Surface treatment compositions, for use on non-food contact and food contact surfaces, are known. Effective surface treatment compositions that have the capacity to disinfect and/or sanitize surfaces in addition, or in alternative to, being used to clean surfaces, are especially useful in food and dairy processing, which are vulnerable to problems with microbial contamination due to the prevalence of microbial food sources. Most surface treatment compositions are either in the form of concentrated liquids requiring dilution prior to use, or are in the form of ready-to-use liquids.

Surface treatment compositions in the form of powders are also known in the industry, but are less common than liquid ones, which can be easier to dilute and/or apply. Some known surface treatment powders require dilution in water prior to application to a surface to be treated. Other known surface treatment powders are applied dry and allowed to reside on a surface to be treated over a period of time. To effectively treat the surface to which such a surface treatment powder has been applied, active ingredients in the powder must be contacted with liquid, which occurs incidentally, e.g., via spills, and/or purposefully, through the addition of liquid to the surface treatment powder and/or to the surface on which it resides. Indeed, to the best of the inventors' knowledge, all surface treatment powders that are currently registered as "sanitizers" with the U.S. Environmental Protection Agency ("U.S. EPA"), require the manual addition of liquid to activate the product and to provide sanitizer level efficacy.

A common use of surface treatment powders is to clean, disinfect and/or sanitize floors in facilities associated with the food industry (including bakeries), animal health, human health, farms and dairies. In these facilities, a surface treatment powder may be spread on the floor, and the active ingredients in the powder are eventually activated by liquid that is spilled on the floor and/or are activated by liquid that is delivered intentionally to the powder and/or to the floor during operations. In these environments, surface treatment powders may impart additional benefits by providing improved traction since the presence of granular material may increase friction on floors that are wet or onto which organic matter has spilled. The presence of surface treatment powders on floors may impart the further benefit of visually indicating that treatment is occurring in specific areas. However, since most if not all commercially available surface treatment powders are white or off-white due to lack of stability in colorants added thereto, they may easily be confused with other substances used in a facility, for example where powdered processing components and/or food ingredients are present (e.g., flour, sugar, baking powder, baking soda, etc.).

While various surface treatment powders have been made and used, it is believed that no one prior to the inventor(s) has made or used the invention described in the appended claims, which eliminates the need to incidentally or purposefully add liquid to a surface treatment powder and/or to a surface to be treated in order to activate the powder.

SUMMARY

Ambient moisture-activatable surface treatment powders pursuant to the present disclosure exhibit a number of improvements over prior art powder compositions including, but not limited to the following.

Known surface treatment powders require the addition of liquid to activate the product. The presently disclosed ambient moisture-activated surface treatment powders do not require the addition of liquid to be activated. But rather, the ambient moisture-activated surface treatment powders are activated by ambient moisture. In some exemplary embodiments, the ambient moisture-activated surface treatment powders may reduce microbial growth on a surface to the which ambient moisture-activatable surface treatment powder has been applied as compared to the microbial growth on a comparable control surface to which no ambient moisture-activatable surface treatment powder has been applied, without necessitating purposeful or incidental: addition of liquid (including water) to the powder, addition of the powder to liquid (including water), addition of liquid (including water) to a surface to which the powder is then applied and/or addition of the powder to a wet surface. Thus, ambient moisture-activated surface treatment powders have particular utility when compared to known powder compositions in industrial settings where dry conditions are preferred or required, and the presence of liquid (e.g., water) would have detrimental effects, such as on machinery and/or on the manufactured product.

Like known surface treatment powders, the presence of the present ambient moisture-activated surface treatment powders on a surface may serve as a visual signal that the surface is being treated. However, unlike known surface treatment powders, such as those described in U.S. Pat. Pub. No. 2016/0066580 (Stevenson, et al.), which are white or off-white, the present ambient moisture-activated surface treatment powders may comprise colorant that may retain sufficient stability to impart color to them when in use. Thus, presence of the present ambient moisture-activated surface treatment powders on a surface may be readily distinguished from other powdered materials, a property that can be particularly advantageous in certain settings. For example, in food and dairy settings, ambient moisture-activated surface treatment powders comprising colorant, may be easily distinguished from powdered processing components, food ingredients and/or food products that are otherwise present there (e.g., salt, flour, sugar, baking powder, baking soda, etc.).

Some known surface treatment powders comprise beads. When these surface treatments are used on surfaces where foot placement (e.g., in a foot pan) or where foot travel occurs (e.g., on a floor), they may result in a slip and fall hazard. The present ambient moisture-activated surface treatment powders may comprise particles that are non-spherical. Thus, when applied to a surface where foot travel occurs, ambient moisture-activated surface treatment powders may advantageously eliminate the slip hazard of competitive beaded products, while in some instances, adding traction.

Known surface treatment powders contain irritants that may become airborne when removed from their containers. It has been found that binders, like polyethylene glycol for example, may be used to bind solid particles of ambient moisture-activated surface treatment powders without causing tackiness and while providing for a free-flowing product. Unlike some powder surface treatment compositions which are free of binders, particularly, free of polyethylene glycol, ambient moisture-activated surface treatment powders are less prone to becoming airborne, as are any irritants contained therein, when the powders are removed from their containers.

Known surface treatment powders may contain high levels of flammable and/or irritable components. For example, antimicrobial surface treatments described in U.S. Pat. Pub. No. 2016/0066580 (Stevenson, et al.) contain dichloroisocyanurate and/or 50 wt. % or more of persalts, such as percarbonate, perphosphate, persulfate, peroxide or perborate salt. These components are known to be corrosive oxidizers and the use thereof, particularly in high concentrations may increase fire potential. Moreover, the higher the level of persalts in the surface treatment powders, the greater the chances of the persalts becoming airborne irritants when the surface treatment powders are removed from their containers. The present ambient moisture-activated surface treatment powders advantageously comprise less than 50 wt. % by weight of the surface treatment powder of one or a combination of persalts, thereby reducing hazards associated with their use. Moreover, in some exemplary embodiments, the ambient moisture-activatable surface treatment powders may be substantially free of chlorine-containing compounds. In any case, unlike known antimicrobial surface treatments (e.g., those described in U.S. Pat. Pub. No. 2016/0066580 (Stevenson, et al.)), ambient moisture-activated surface treatment powders do not require addition of liquid to be activated.

Known surface treatment powders may require bleach activators to be effective. For example, antimicrobial surface treatments described in U.S. Pat. Pub. No. 2016/0066580 (Stevenson, et al.) disclose bleach activators as a required component. Advantageously, the present ambient moisture-activated surface treatment powders may be substantially free of bleach activators, while still being capable of effectively treating a surface. Moreover, unlike the antimicrobial surface treatments described in U.S. Pat. Pub. No. 2016/0066580 (Stevenson, et al.), ambient moisture-activated surface treatment powders do not require addition of liquid to be activated.

Exemplary ambient moisture-activatable surface treatment powders may comprise by weight percentage of the surface treatment powder, less than 50% by weight of the surface treatment powder of persalt, positively charged phase transfer agent and alkaline pH buffering salt. Further exemplary ambient moisture-activatable surface treatment powders are substantially free of bleach activators and/or chlorine.

Some exemplary ambient moisture-activatable surface treatment powders may consist essentially of, by weight percentage of the surface treatment powder: less than 50% of percarbonate salt, from about 0.5% to about 30% quaternary ammonium salt, from about 15% to about 90% monocationic carbonate salt, from about 0.5% to about 15% chelating agent, from about 0.1% to about 10% glycol and colorant.

Exemplary methods of treating a surface, may comprise applying to the surface an ambient moisture-activatable surface treatment powder comprising by weight percentage of the surface treatment powder, less than 50% by weight of the surface treatment powder of persalt, positively charged phase transfer agent and alkaline pH buffering salt. Some exemplary methods further comprise steps selected from the group of: cleaning the surface, sanitizing the surface, disinfecting the surface, sterilizing the surface, disrupting biofilm on the surface, removing biofilm from the surface and combinations thereof. These and other exemplary methods may exclude steps selected from the group of: adding liquid to the ambient moisture-activatable surface treatment powder, adding liquid to the surface prior to applying the ambient moisture-activatable surface treatment powder to the surface, adding liquid to the surface after applying the ambient moisture-activatable surface treatment powder to the surface and combinations thereof.

BRIEF DESCRIPTION OF THE DRAWING

The accompanying drawing is incorporated in and forms a part of the specification and illustrates aspects of the present invention, and together with the description serve to explain the principles of the invention.

The appended figure is a graph of size distribution in exemplary ambient moisture activated surface treatment powder.

DETAILED DESCRIPTION

The following description of certain examples of the invention should not be used to limit the scope of the present invention. Other examples, features, aspects, embodiments, and advantages of the invention will become apparent to those skilled in the art from the following description, which is by way of illustration, one of the best modes contemplated for carrying out the invention. As will be realized, the invention is capable of other different and obvious aspects, all without departing from the invention. Accordingly, the drawings and descriptions should be regarded as illustrative in nature and not restrictive.

All percentages, parts and ratios as used herein, are by weight of the total composition of ambient moisture-activatable surface treatment powder, unless otherwise specified. All such weights, as they pertain to listed ingredients, are based on the active level and, therefore, do not include solvents or by-products that may be included in commercially available materials, unless otherwise specified.

Numerical ranges as used herein are intended to include every number and subset of numbers within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 5 to 6, from 1 to 9, from 3.6 to 4.6, from 3.5 to 9.9, and so forth.

All references to singular characteristics or limitations of the present disclosure shall include the corresponding plural characteristic or limitation, and vice versa, unless otherwise specified or clearly implied to the contrary by the context in which the reference is made.

All combinations of method or process steps as used herein can be performed in any order, unless otherwise specified or clearly implied to the contrary by the context in which the referenced combination is made.

"Ambient moisture" as used herein means liquid vapor, e.g. water vapor, present in an environment. Ambient moisture may be described in terms of relative humidity in the environment.

"Ambient moisture-activatable surface treatment powder" as used herein means a powder that "effectively treats" a surface without necessitating purposeful or incidental: addition of liquid (including water) to the powder, addition of the powder to liquid (including water), addition of liquid (including water) to a surface to which the powder is then applied and/or addition of the powder to a wet surface. "Effectively treats" as used herein means a reduction of microbial growth on a surface to the which ambient moisture-activatable surface treatment powder has been applied, as compared to the microbial growth on a comparable control surface to which no ambient moisture-activatable surface treatment powder has been applied. Treatment of a surface may include cleaning, disinfecting and/or sanitizing a surface. An "ambient moisture-activatable surface treatment powder" is activated by ambient moisture in the environment.

"Biofilm" as used herein means complex microbial communities characterized by cells attached to surfaces, interfaces, or each other and are embedded in a matrix of extracellular polymeric substances (EPS) of microbial origin.

"Bleach activator" as used herein has the meaning set forth in U.S. Pat. Pub. No. 20160066580 (Stevenson, et al.), which is incorporated by reference herein. Bleach activator includes any compound that reacts with hydrogen peroxide to form a peracid. Thus, bleach activators are sometimes referred to as peracid precursors. Various bleach activators are known in the art. Examples of bleach activators include tetra acetyl ethylene diamine (TAED), Ethylenediamine (EDA), sodium nonanoyloxybenzenesulfonate (NOBS), Decanoic acid, 2-[[(4-sulfophenoxy)carbonyl]oxy]ethyl ester, sodium salt (DECOBS), and mixtures thereof. In one embodiment, the bleach activator comprises, consists essentially of, or consists of tetra acetyl ethylene diamine (TAED).

"Disinfectant" as used herein means a substance or a mixture of substances (including solutions) that destroy or irreversibly inactivate bacteria, fungi and viruses, but not necessarily bacterial spores, in an inanimate environment or on a surface (e.g., in or on a substrate).

"Foot pan" as used herein means a receptacle that is used to treat footwear. Foot pans include pans, mats, floors and any other receptacles that hold surface treatment powders, for example, cleaners, disinfectants and/or sanitizers.

"Sanitizer" as used as used herein means a substance or a mixture of substances (including solutions) that reduce a bacterial population in an inanimate environment (e.g., a substrate) by significant numbers, (e.g., a 3 log 10 reduction) or more, but that does not destroy or eliminate all bacteria.

It should be noted that ambient moisture-activatable powder as described herein may act as a disinfectant and a sanitizer by respectively destroying or irreversibly inactivating certain bacteria, fungi and/or viruses present on a surface, and reducing the population of certain other bacteria that are present on the same surface.

It should also be noted that ambient moisture-activatable powders as described herein may remove and/or disrupt biofilm from various surfaces in addition to, or in alternative to, acting as a disinfectant and/or sanitizer.

"Substantially free" as used herein means no effective amount, or about 1 wt. % or less, about 0.1 wt. % or less, or even about 0.01 wt. % or less or 0% (i.e., completely free).

The ambient moisture-activatable compositions and methods of use described herein may be characterized by having broad utility, including, but not limited to, utility in the food industry (e.g., in bakeries), on farms, in dairies and in animal and human health care environments. Within these and other environments, the ambient moisture-activatable compositions may be used on the floor, dispensed into foot pans, used in entry ways into buildings and/or used as intervention between rooms or between warehouse space and processing space.

Exemplary ambient moisture-activatable powders may be activated at any relative humidity that is sufficient to chemically interact (e.g., dissolve) at least a portion of the powder. Exemplary ambient moisture-activatable powders may be activated at a relative humidity of at least about 5%. Some, exemplary ambient moisture-activatable powders may be activated at a relative humidity of from about 5% to about 100%.

Exemplary ambient moisture-activatable surface treatment powders comprise persalt, positively charged phase transfer agent and alkaline pH buffering salt. Additional exemplary ambient moisture-activated surface treatment powders comprise components selected from the group of: chelating agent, dust-reducing additive, colorant and combinations thereof. The foregoing compositional components are discussed in further detail below.

One or more persalts may be present in ambient moisture-activated surface treatment powders. Persalts of use in ambient moisture-activatable surface treatment powders include, but are not limited to, those described in U.S. Pat. Nos. 4,941,989 and 5,320,805, the disclosures of which are incorporated by reference herein. Persalts are alkaline water-soluble salts having hydrogen peroxide of crystallization or forms peroxide upon dissociation (e.g. sodium carbonate-hydrogen peroxide of crystallization). When persalts are dissolved in water, peroxide ion is released. Useful persalts may be selected from the group of: percarbonate salt, perborate salt, perphosphate salt, persulfate salt, persilicate salt, peroxide salt, peracetate salt and combinations thereof. The persalts may be associated with a cation that will give an alkaline water-soluble peroxy salt. Exemplary cations may include alkali metals. In some exemplary compositions, the persalt is "sodium percarbonate" having the empirical formula 2(Na2CO3)—nH2O2, where n=1, 2 or 3, the "sodium percarbonate" having the hydrogen peroxide of crystallization.

Persalts may be present in ambient moisture-activated surface treatment powders at any useful amount according to one skilled in the art. Some exemplary ambient moisture-activated surface treatment powders comprise less than 50 wt. % persalt. Some exemplary ambient moisture-activated surface treatment powders comprise from about 5 wt. % to about 49 wt. %, from about 10 wt. % to about 40 wt. %, or from about 15 wt. % to about 35 wt. %, of one or more persalts.

One or more positively charged phase-transfer agents may be present in ambient moisture-activated surface treatment powders. Positively charged phase-transfer agents of use in ambient moisture-activatable surface treatment powders include, but are not limited to, those positively charged phase-transfer agents described in U.S. Pat. Nos. 4,941,999 and 5,320,805, the disclosures of which are incorporated by reference herein. Positively charged phase-transfer agents comprise a positively charged ion and a counter anion. Exemplary positively charged phase-transfer agents may be selected from the group of: quaternary ammonium salt, e.g., didecyl dimethyl ammonium chloride (DDDM), and/or tetradecyl dimethyl benzyl ammonium chloride, phosphonium salt, e.g., t-butyl phosphonium iodide, sulfonium salt, e.g., tributyl sulfonium chloride, and combinations thereof. Hydrocarbyl groups attached to the nitrogen phosphorous or sulfur in the positively charged phase transfer agents may contain a total number of carbons such that the compound is water-soluble but yet has sufficient lipophilic character to permit it to pass from the aqueous phase into a non-polar oil (or organic) phase. Also, the ion-pair formed between the positively charged ion and negatively charged ion may be an intimate ion-pair that is not dissociated in the solution. The phase-transfer agents may become disinfecting and sterilizing as they become lipophilic and are thus able to be used to clean, penetrate and/or destroy biofilms and microbial cells.

In some exemplary ambient moisture-activated surface treatment powders, the positively charged phase-transfer agents may be selected from quaternary ammonium salts having a chain of carbon atoms of from 4 to 30, from 6 to 30 or from 8 to 25, carbon atoms in length, on the quaternary nitrogen. It may be desirable for the quaternary ammonium salt to not only be water-soluble, but to also possess sufficient lipophilic character to permit it to pass from the aqueous phase into an oil (or organic) phase when forming an ion-pair with peroxide ion. As mentioned above, when the alkaline salt containing hydrogen peroxide of crystallization is dissolved in an aqueous solution of a positively charged ion such as a quaternary ammonium salt, the alkaline salt may extract a proton from the hydrogen peroxide, leaving the negatively charged hydroperoxide ion. The hydroperoxide ion may then become intimately associated with the quaternary ammonium ion such that its negative charge is effectively neutralized as follows:

$$\underset{\text{ionic}}{R_4N^+ + O_2H^-} \longrightarrow \underset{\text{ion-pair}}{[R_4N^+ - O_2H^-]}$$

Wherein R is an alkyl group or an aryl group.

The resultant lipophilic quaternary ammonium hydroperoxide ion pair may then pass from the aqueous phase into an oil, or organic phase where the hydroperoxide ion may exert its decontamination disinfecting and sterilizing effects. Without wishing to be bound by theory, it is believed that the decontaminating and disinfecting characteristics of quaternary ammonium salts are enhanced synergistically to form sterilizers when they are combined with one or more persalts.

Another aspect of the present disclosure is that the phase-transfer ion-pair may be soluble in water and in lipids, rendering the ion-pair properties which do not exist in the individual components.

Quaternary ammonium salts of use in the present disclosure may be in liquid or solid (e.g., powder) form. If the quaternary ammonium salts are in liquid form, they may be converted into a solid form prior to being combined with other components of ambient moisture-activated powder or applied, in liquid form, to the other components in ambient moisture-activated powder and dried (e.g., spray-dried).

Exemplary quaternary ammonium salts generally have the following formula $R_1R_2R_3R_4N^+X^-$, wherein: $R_1R_2R_3R_4$ R is selected from the group of: alkyl group, aryl group and combinations thereof, and X is an anion present in salt. Depending on the nature of the R groups, the anion, and the number of quaternary nitrogen atoms present, the antimicrobial QACs are typically classified as mono alkyl trimethyl ammonium compounds, mono alkyl dimethyl benzyl ammonium salts, dialkyl dimethyl ammonium salts, heteroaromatic ammonium salts, polysubstituted quaternary ammonium salts, bisquaternary ammonium salts or polymeric ammonium salts. Examples of mono alkyl trimethyl ammonium salts include cetyl trimethyl ammonium bromide (CTAB); alkyl trimethyl ammonium chloride; alkyl aryl trimethyl ammonium chloride; cetyl dimethyl ethyl ammonium bromide. Examples of mono alkyl dimethyl benzyl ammonium salts include alkyl dimethyl benzyl ammonium chlorides; dodecyl dimethyl 3,4 dichlorobenzyl ammonium chloride; and mixtures of alkyl dimethyl benzyl and alkyl dimethyl substituted benzyl (ethyl benzyl) ammonium chlorides. Examples of dialkyl dimethyl ammonium salts include didecyl dimethyl ammonium halides and octyl dodoceyl dimethyl ammonium chlorides. Examples of heteroaromatic ammonium salts include cetylpyridinium halide (CPC); 1-[3-chloroallyl]-3,5,7-triaza-1-azoniaadamantane; alkyl-isoquinoliniumm bromide and alkyldimethylnaphthylmethyl ammonium chloride. Examples of poly-substituted quaternary ammonium compounds include alkyl dimethyl benzyl ammonium saccharinate and alkyl dimethylethylbenzyl ammonium cycloheylsulfamate. Examples of bis-quaternary ammonium salts include 1,10-bis (2-mthyl-4-aminoquinolinium chloride)-decane; b1,6-Bis [1-methyl-3-(2,2,6-trmethyl cyclohexyl)-propyldimethyl ammonium chloride] hexane.

Dialkyl dimethyl ammonium chlorides of use may include didecyl dimethyl ammonium chlorides; dioctyl dimethyl ammonium chloride; didecyl dimethyl ammonium chloride and octyl dodecyl dimethyl ammonium chloride.

Positively charged phase transfer agent may be present in ambient moisture-activated surface treatment powders at any useful amount according to one skilled in the art. Some exemplary ambient moisture-activated surface treatment powders comprise from about 0.5 wt. % to about 30 wt. %, from about 0.75 wt. % to about 20 wt. %, or from about 1 wt. % to about 10 wt. %, of one or more positively charged phase transfer agents.

One or more alkaline pH buffering salts may be present in ambient moisture-activated surface treatment powders. Alkaline pH buffering salts of use in ambient moisture-activatable surface treatment powders may maintain the alkaline pH of the powder, when the surface treatment powder is used. Any alkaline pH buffering salt suitable for ambient moisture-activated powder compositions may be of use. Some pH buffering salts may also serve as stability enhancers, solid diluents and/or flow enhancers.

Suitable alkaline pH buffering salts may be selected from the group of monocationic carbonate salts, bicarbonate salts and combinations thereof. Exemplary monocationic carbonate salts may be selected from the group of: sodium carbonate, potassium carbonate, lithium carbonate, ammonium carbonate and combinations thereof. Exemplary bicarbonate salts may be selected from the group of: sodium bicarbonate, potassium bicarbonate, lithium bicarbonate, ammonium bicarbonate and combinations thereof. Alkaline pH buffering salts may be used in an amount sufficient to establish a pH of about 8 or more, about 9 or more, about 9.5 or more, about 10 or more, about 10.5 or more, or about 10.75 or more, when the powder composition is exposed to ambient moisture. Exemplary ambient moisture-activated surface treatment powders comprise from about 15 wt. % to about 90 wt. %, from about 25 wt. % to about 85 wt. %, or from about 50 wt. % to about 80 wt. %, of one or more alkaline pH buffering salts. Some exemplary ambient moisture-activated surface treatment powders comprise from about 1 wt. % to about 50 wt. %, from about 2 wt. % to about 25 wt. %, or from about 5 wt. % to about 10 wt. %, sodium carbonate.

One or more chelating agents may be present in ambient moisture-activated surface treatment powders. Chelating agents may serve as a chelant for metal ions in ambient moisture-activated surface treatment powders, and may act as a stability enhancer. Useful chelating agents may be apparent to one skilled in the art. Exemplary ambient moisture-activated surface treatment powders may comprise chelating agents selected from the group of: ethylenediaminetetraacetic acid ("EDTA"), EDTA derivatives, 8-hydroxyquinoline, 1 hydroxyethylidene-1,1-diphosphonic acid ("HEDP"), HEDP derivatives, glutamic acid diacetic acid ("GLDA"), GLDA derivatives, diethylenetriaminepentaacetic acid ("DTPA"), DPTA derivatives, N-(2-Hydroxyethyl)ethylenediaminetriacetic acid ("HEDTA"), ethanoldiglycinic acid ("EDG"), glucoheptonate, sodium pyrophosphate, potassium hypophosphite, sodium tripolyphosphate, citric acid and combinations thereof.

Exemplary ambient moisture-activated surface treatment powders comprise chelating agent in any suitable amount. For example, one or more chelating agents may be present at from about 0.5 wt. % to about 15 wt. %, from about 1 wt. % to about 10 wt. %, or from about 2 wt. % to about 5 wt. %, of ambient moisture-activated surface treatment powders.

Known surface treatment powders contain irritants that may become airborne when removed from their containers. It has been found that the presence of one or more dust-reducing additives may be used to bind solid particles of ambient moisture-activated surface treatment powders without dissolving the powders or causing tackiness and while providing for a free-flowing product. Binders, like polyethylene glycol for example, act as a dust-reducing additive without negatively impacting sanitizer level efficacy. Thus, unlike known powder surface treatment compositions which are free of binders, particularly, free of polyethylene glycol, ambient moisture-activated surface treatment powders are less prone to becoming airborne when removed from its container.

One or more binders may be present in ambient moisture-activated surface treatment powders. Exemplary binders of use may be selected from the group of polyhydric alcohol, glycol, ethoxlyated alcohol, block copolymers of ethylene oxide (EO) and propylene oxide (PO), ethoxylene and combinations thereof. Some exemplary ambient moisture-activated surface treatment powders may comprise polyethylene glycol. In some exemplary ambient moisture-activated surface treatment powders, polyethylene glycol may be present in ambient moisture-activated surface treatment powders at from about 0.1 wt. % to about 10 wt. % from about 0.5 wt. % to about 5 wt. % or from about 1 wt. % to about 4 wt. %.

To the best of the inventors' knowledge, all commercial surface treatment powders are white or off-white. When in use, known surface treatment powders may be easily confused with other powders that are present. For example, in food (e.g., bakery) and dairy processing settings, known surface treatment powders may easily be confused with other substances used and/or made in a facility, for example where powdered food ingredients are present (e.g., flour, sugar, baking powder, baking soda, etc.). For this reason, it would be desirable to add colorants to known surface treatment powders, however, colorants tend to be unstable in known surface treatment powders. Without wishing to be bound by theory, it is believed that relatively high levels of corrosive oxidizers, e.g., persalts present in known surface treatment powders at 50% or more by weight of the powders, and/or other corrosive substances may render colorants unstable.

Exemplary ambient moisture-activated surface treatment powders according to the present disclosure may comprise colorants that maintain their color during the useful life of ambient moisture-activated surface treatment powders. One or more colorants may be present in any amount that is suitable to impart a color other than white or off-white to ambient moisture-activated surface treatment powders. Without wishing to be bound by theory, it is believed that colorants are more stable in the present ambient moisture-activated surface treatment powders than in known surface treatment powder for the following reasons. First, the present ambient moisture-activated surface treatment powders comprise relatively low levels of corrosive oxidizers, e.g., less than 50% persalt, that destabilize colorants. Second, it is believed that the presence of chelating agent may stabilize colorants present in the ambient moisture-activated surface treatment powders.

The type and amount of colorant that may be present in ambient moisture-activated surface treatment powders may be selected by one skilled in the art. Exemplary ambient moisture-activated surface treatment powders that have a blue hue or a red hue and may comprise colorants selected from the group of: Liquitint® Blue HP from Milliken Chemical (Spartanburg, SC), D&C Red #28 from DeWolf (Warwick, RI), Pylaklor Dark Blue LX-9442 from Pylam Dyes™ (Tempe, AZ) and combinations thereof. These exemplary ambient moisture-activated surface treatment powders may comprise the colorants at from about 0.0005 wt. % to about 1 wt. %, from about 0.01 wt. % to about 0.1 wt. %, or from about 0.005 wt. % to about 0.1 wt. %.

Ambient moisture-activated surface treatment powders may be made using routine techniques. An exemplary method of making ambient moisture-activated surface treatment powders is set forth below in the Examples section below. The resulting powders may be characterized by having a relatively larger average particle size than known surface treatment powders. For example, the average particle size of Ultra Step™ from Sterilex® (Hunt Valley, MD), which is an exemplary ambient moisture-activated powder per the present disclosure, is compared to the average particle size of Ultra Powder™, liquid-activated powder surface treatment that is also from Sterilex®. The two powder products are subjected to sieve analysis to determine the size distribution of the particles contained in each powder. The results of the sieve analysis are set forth in the appended Figure, which shows that Ultra Step™ contains particles ranging in size of from about 50 microns to about 1,000 microns, with over about 65% of the particles having a size of from about 125 microns to about 250 microns (the bulk density of Ultra Step™ is between about 1.16 $cm^3$ and about 1.20 $g/cm^{3}$). While Ultra Powder™ also contains particles ranging in size of from about 50 microns to about 1,000 microns, it has a much higher percentage of particles that are smaller than about 125 microns; it is believed that this is due to distribution of sodium carbonate and quaternary ammonium salt, both of which are present at much higher concentrations in Ultra Powder™. When each of the powders is removed from its respective container, Ultra Powder™ is observed to be more dusty than Ultra Step™. For this reason, in addition to others, it is believed that the particle size distribution in Ultra Step™ is more desirable.

As noted above, ambient moisture-activatable compositions and methods of use described herein may be characterized by having broad utility, and can be used in any setting to treat a surface, for example a hard surface. Exemplary methods of treating a surface comprise applying to the surface an ambient moisture-activatable surface treatment powder. Treatment of a hard surface may comprise one or more steps of cleaning the surface, sanitizing the surface, disinfecting the surface, sterilizing the surface, disrupting biofilm on the surface, removing biofilm from the surface and combinations thereof. Since the ambient moisture-activatable powders do not require addition of liquid to be activated, exemplary methods may comprise applying the ambient moisture-activatable powders to dry surfaces. Some exemplary methods exclude steps selected from the group of: adding liquid to the ambient moisture-activatable surface treatment powder, adding liquid to the surface prior to applying the ambient moisture-activatable surface treatment powder to the surface, adding liquid to the surface after applying the ambient moisture-activatable surface treatment powder to the surface and combinations thereof. Some exemplary methods may further comprise increasing foot traction on the surface.

Some exemplary methods comprise applying ambient moisture-activatable surface treatment powder comprising colorant to a surface. These methods are of particular use in environments in which white powders may already be present, for example, in food processing facilities and/or dairies, where powdered food ingredients or products may be present (e.g., flour, sugar, baking powder, baking soda, etc.).

Known surface treatment powders may be used to treat footwear, by dispensing them into foot pans. Traffic C.O.P. Foot Pan Powder from Paragon Specialty Products (Rainsville, AL) is an example of a commercially available surface treatment powder comprising chlorine as an active ingredient. According to its usage instructions, Traffic C.O.P. is dispensed into a foot pan at a ½-inch level of powder, or more if desired, and must be fully changed every two weeks to maintain desired cleaning and odor control benefits.

Like known surface treatment powders, the present ambient moisture-activatable powders may be used to treat footwear. These methods may be of particular use in a dairy, poultry farm or swine farm. Exemplary methods comprise dispensing the present ambient moisture-activatable powders into a foot pan at any desirable level, for example, a level of about ½-inch, or more. Exemplary methods comprise changing the foot powder about every 4 to about every 12 weeks, or from about every 6 to about every 10 weeks, to maintain benefits selected from the group of: cleaning, odor control, disinfection, sanitization and combinations thereof. The present ambient moisture-activatable powders need not be changed as frequently (e.g., every two weeks) as known chlorine-containing surface treatment powders. It is believed that this is due to the relatively greater instability (i.e., volatility) of chlorine when compared to the active ingredients in the present ambient moisture-activated surface treatment powders.

Examples and Data

An exemplary ambient moisture-activated powder comprising by total weight percentage of the powder, the components set forth in Table 1:

TABLE 1

| | |
|---|---|
| Sodium Carbonate | 5.0% |
| Sodium Bicarbonate | 74.595% |
| Sodium Percarbonate | 12.7% |
| Quaternary Ammonium | 1.7% |
| EDTA | 5.0% |
| Polyethyleneglycol | 1.0% |
| Liquitint Blue HP | 0.005% |
| | 100.0 |

The exemplary ambient moisture-activatable powder is made as follows. A pre-mix of the colorant and liquid binder is prepared. In appropriate blending tank, which may be a paddle blender, ribbon blender, or similar unit, the formula dry ingredients, persalt, alkaline pH buffering salts, quaternary ammonium compound and chelant, are mixed. While the dry ingredients are being mixed, the pre-mix is applied onto the mix. The resulting blend is further mixed until a uniform powder is attained.

Effective treatment of a surface with the exemplary ambient moisture-activated powder set forth above without the addition of liquid water, is determined using a modified version of the ASTM E1153 protocol "Test Method for Efficacy of Sanitizers Recommended for Inanimate Non-Food Contact Surfaces." The test organism is *Staphylococcus aureus* (ATCC 6538). The test organism is prepared by growth in liquid culture medium containing 5% fetal bovine serum as the artificial soil load. Sterilized glass slide carriers are inoculated with the test culture over a 1-inch×1-inch area, and in sufficient quantity to provide at least $7.5\times10^5$ colony forming units per carrier. The carriers are dried completely in an incubator at 36° C.+/−2° C. for one hour. Test carriers are treated with two different dose rates: 78 ounces/100 square feet equivalent to about a monolayer, and 780 ounce/100 square feet equivalent to multiple layers. Test carriers are incubated for contact times of 8, 12, and 24 hours, and at relative humidities of 35%, 50%, and 70%. Control carriers treated with a buffered saline solution are incubated in parallel with the test carriers. After the treatment contact time, test and control carriers are chemically neutralized with 20 mL of Dey Engley neutralizing broth supplemented with 0.1% catalase. Neutralized test substance is evaluated for growth to determine the surviving microorganisms at the respective dose rates, contact times, and relative humidities. The enumeration plates are incubated under aerobic conditions for 24-48 hours at 36° C.+/−1° C. The enumeration count on carriers treated with the test substance is subtracted from the enumeration count on control carriers incubated at the same relative humidity and contact time to determine microbial log reductions. The effect of treatment with the exemplary ambient moisture-activated surface treatment powder is tested in triplicate (n=3), and the log reduction results are set forth in the Table 2 below:

TABLE 2

| | Relative Humidity (%)/Contact Time (hours) | | | | | | | | |
|---|---|---|---|---|---|---|---|---|---|
| | 35% | | | 50% | | | 70% | | |
| Dose Rate (oz/100 $ft^2$) | 8 Hr | 12 Hr | 24 Hr | 8 Hr | 12 Hr | 24 Hr | 8 Hr | 12 Hr | 24 Hr |
| 78 | 1.4 | 1.3 | 0.8 | 0.9 | 2.0 | 1.6 | ND | >5.1 | ND |
| 780 | 2.2 | 2.4 | >5.2 | 1.7 | 3.1 | >4.9 | ND | >5.1 | ND |

*The limit of detection for the study is 10 CFU/carrier.

Values observed below the limit of detection are represented as <1.00E+01.

CFU = Colony Forming Units.

"ND" means not done.

Based upon the data, the following may be surmised. Ambient moisture-activated surface treatment powder may be activated by ambient moisture from various relative humidities and may effectively reduce *S. aureus* without necessitating purposeful or incidental addition of a liquid. Additionally, effective treatment may be possible with less exposure time of a surface to the ambient moisture-activated surface treatment powder with increasing relative humidity.

It should be understood that any one or more of the teachings, expressions, embodiments, examples, etc. described herein may be combined with any one or more of the other teachings, expressions, embodiments, examples, etc. that are described herein. The above-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and figures.

We claim:

1. A method of treating a hard surface, the method comprising applying an ambient moisture-activated hard surface treatment powder to the hard surface, wherein the treatment powder comprises by weight percentage of the hard surface treatment powder:

(a) from about 5% to less than about 50% persalt, by weight of the hard surface treatment powder;

(b) a phase-transfer agent selected from one or both of a sulfonium salt and a phosphonium salt; and (c) an alkaline buffering agent comprising:

i) about 5% to about 10% sodium carbonate by weight of the hard surface treatment powder; and ii) about 20.5% to about 90% of sodium bicarbonate by weight percentage of the hard surface treatment powder, wherein the hard surface treatment powder comprises particles, wherein at least about 65% of the particles range in size of from about 125 microns to about 250 microns.

2. The method of claim 1, wherein the surface is in an environment in which a white powder other than the hard surface treatment powder is present.

3. The method of claim 2, wherein the white powder is selected from flour, sugar, baking powder, baking soda and combinations thereof.

4. The method of claim 1, wherein the surface to be treated is footwear, the method further comprising placing the ambient moisture-activated hard surface treatment powder in a foot pan.

5. The method of claim 4, further comprising replacing the powder in the foot pan from about every four to about every 12 weeks.

6. The method of claim 1, wherein the hard surface treatment powder is substantially free of bleach activator.

7. The method of claim 1, wherein the hard surface treatment powder is substantially free of anionic surfactant.

8. The method of claim 7, wherein the hard surface treatment powder comprises from about 5% to about 40% of persalt by weight percentage of the hard surface treatment powder.

9. The method of claim 8, wherein the hard surface is in a setting characterized by dry conditions.

10. The method of claim 8, wherein the hard surface is in a food processing facility.

11. The method of claim 1, wherein the hard surface is a floor.

12. The method of claim 1, further comprising increasing traction on the hard surface.

13. An ambient moisture-activatable hard surface treatment powder comprising, by weight percentage of the surface treatment powder:

(a) from about 5% to about 10% sodium carbonate;

(b) from about 15% to about 90% sodium bicarbonate;

(c) from about 10% to about 40% sodium percarbonate;

(d) from about 1% to about 10% a phase-transfer agent selected from one or both of a sulfonium salt and a phosphonium salt;

(e) from about 2% to about 5% EDTA; and (f) from about 0.1% to about 4% polyethylene glycol.

14. The ambient moisture-activatable had surface treatment powder of claim 13, wherein the powder is substantially free of bleach activator.

15. The ambient moisture-activatable had surface treatment powder of claim 13, further comprising a colorant.

16. The ambient moisture-activatable had surface treatment powder of claim 13, wherein the ambient moisture is a relative humidity of at least about 5%.

* * * * *